United States Patent [19]

Durand

[11] Patent Number: 4,670,084

[45] Date of Patent: Jun. 2, 1987

[54] APPARATUS FOR APPLYING A DYE IMAGE TO A MEMBER

[76] Inventor: David Durand, 120 Lambie Cr., Portsmouth, R.I. 02871

[21] Appl. No.: 743,287

[22] Filed: Jun. 11, 1985

Related U.S. Application Data

[63] Continuation of Ser. No. 503,667, Jun. 20, 1983, abandoned.

[51] Int. Cl.[4] ........................ B32B 31/00; B44C 1/16; B30B 5/02; B02C 11/08

[52] U.S. Cl. ........................................ 156/540; 8/468; 100/93 P; 101/33; 156/230; 156/382; 156/583.3

[58] Field of Search ............ 156/540, 541, 386, 583.8, 156/583.9, 583.3, 230, 240, 382, 381, 274.4, 272.2, 298, 299, 361; 248/363, 362; 69/21; 8/467, 468; 100/93 P, 211; 101/33, 34

[56] References Cited

U.S. PATENT DOCUMENTS

| | | | |
|---|---|---|---|
| 2,620,289 | 12/1952 | Douglas | 156/241 |
| 2,740,895 | 4/1956 | Miller | 156/240 |
| 3,615,971 | 10/1971 | Perry . | |
| 3,768,280 | 10/1973 | Kannegiesser . | |
| 3,818,823 | 6/1974 | Bond | 156/230 |
| 3,886,020 | 5/1975 | Shank, Jr. . | |
| 3,945,879 | 3/1976 | Fletcher . | |
| 4,033,030 | 7/1977 | Robinson | 156/230 |
| 4,058,055 | 11/1977 | Douglas . | |
| 4,078,962 | 3/1978 | Krueger | 156/286 |
| 4,098,184 | 7/1978 | Okada et al. . | |
| 4,174,250 | 11/1979 | Durand | 156/583.1 |
| 4,314,814 | 2/1982 | Deroode . | |
| 4,354,851 | 10/1982 | Hix et al. | 8/471 |
| 4,379,018 | 4/1983 | Griesdorn | 100/93 P |

FOREIGN PATENT DOCUMENTS

| | | |
|---|---|---|
| 14615 | 8/1980 | European Pat. Off. . |

*Primary Examiner*—Donald E. Czaja
*Assistant Examiner*—Louis Falasco
*Attorney, Agent, or Firm*—Cushman, Darby & Cushman

[57] ABSTRACT

An apparatus for applying preselected dye images to members incident to processes of the type utilizing sheets bearing dyes in the mirror images of the preselected images, wherein the sheets are overlayed on the members and maintained in pressurized engagement therewith while the sheets and the members are heated. The apparatus comprises a bed for receiving a member thereon with a dye bearing sheet on the member and a resiliently flexible membrane which is positionable over the sheet on the member. A vacuum assembly of the apparatus is operable to evacuate the area between the membrane and the bed in order to draw the membrane into pressurized engagement with the sheet on the member. Radiant heating elements of the apparatus are operable to heat the membrane after the vacuum assembly has been actuated, whereby the dye on the sheet is applied to the member to produce the preselected image thereon.

12 Claims, 9 Drawing Figures

APPARATUS FOR APPLYING A DYE IMAGE TO A MEMBER

This is a continuation of application Ser. No. 503,667, filed June 20, 1983 now abandoned.

BACKGROUND AND SUMMARY OF THE INVENTION

The instant invention relates to the application of dye images to various types of members, and more particularly to an apparatus for applying dye images to members utilized a sheet or sheets bearing dyes in the mirror images of the desired images, wherein the dyes are of the type which require heat for the application thereof.

Processes for applying dye images to various types of members, wherein dyes are transferred from sheets bearing the dyes in the mirror images of the desired images, are generally known in the printing art. In this regard, a process of this general type is disclosed in applicant's copending U.S. patent application Ser. No. 377,666, entitled "Method of Applying a Dye Image to a Plastic Member and the Image Bearing Member Thereby Formed". Other processes which are generally related to this art are known in the sublimation printing field. In general, processes of this type are carried out by overlying a sheet bearing dye in the miror image of the desired image on a member so that the image is in the desired orientation thereon and by thereafter simultaneously applying heat and pressure to the sheet to transfer the dye to the member so that the desired image is produced thereon.

The apparatus of the instant invention is operable for carrying out processes of this general type and comprises a bed assembly having a surface for receiving a member with a dye bearing sheet thereon, a flexible membrane which is positionable in overlying relation on the dye bearing sheet on the member and on the portion of the bed assembly surface adjacent thereto, vacuum means for drawing the membrane into pressurized communication with the sheet to effect the pressurized engagement thereof with the member, and means for heating the membrane to thereby simultaneously heat the sheet, the dye, and the member in order to transfer the dye to the member to produce the desired image thereon. In the preferred embodiment of the apparatus of the instant invention, the heating means comprises one or a plurality of radiant heating elements which emit radiant heat, preferably primarily in the infrared wavelength range, to effect heating of the flexible membrane, the dye and the member to which the dye image is to be applied. In addition, the radiant heating means is constructed so that it emits radiation towards the bed assembly surface from various angles whereby a three-dimensional member on the bed assembly surface can be heated uniformly. In this regard, preferably the radiant heating means comprises an infrared radiation emitter and a parabolic reflector which directs radiation from the emitter towards the bed assembly surface at various relative angles. Also in the preferred embodiment, the flexible membrane is preferably matched with the radiant heating means so that it is specifically absorptive to radiation within the wavelength range emitted therefrom to achieve optimum heating efficiency.

The apparatus of the instant invention is particularly effective for applying disperse dye images by plastic members in accordance with the method disclosed in the applicant's aforementioned copending U.S. patent application Ser. No. 377,666. The apparatus of the instant invention can be used for applying one or a plurality of images to a single member or for simultaneously applying a plurality of dye images to a plurality of members even though the various members have irregular printing surfaces and are three-dimensional in nature. In this regard, because the apparatus of the instant invention utilizes a flexible membrane and a means for applying a vacuum to the membrane to effect pressurized communication between a sheet and a member disposed on the bed assembly surface, a plurality of members can be positioned on the bed assembly surface, and dye images can be simultaneously applied to all of the members with one or a plurality of sheets. This is because the membrane will simultaneously conform to the configurations of all of the members and cause pressure to be applied to all of the various surfaces of the members notwithstanding some irregularities in the surface configurations thereof. In addition, it is possible to simultaneously apply dye images to two or more different surfaces of a single member with the apparatus of the instant invention. Specifically, by utilizing a dye bearing sheet having a plurality of mirror images thereon wherein the sheet is die-cut so that it can conform to the various surfaces of a single member, when the membrane is moved into pressurized communication with the member the sheet will be positioned in pressurized engagement with the different surfaces thereof so that the different images are applied to the appropriate surfaces. It should be pointed out, however, that when applying images to surfaces which are in nonparallel relation to the bed assembly surface it is important that the radiant heating means be of the type hereinabove described herein radiation is directed at the bed assembly surface from various angles so that all of the surfaces of the member are heated uniformly.

One particular use for the apparatus of the instant invention is in the application of dye images to keys of the type utilized in keyboards for typewriters, computers and the like. Specifically, the apparatus of the instant invention can be constructed so that it is adapted for simultaneously applying dye images to the keys of a fully assembled keyboard. In this regard, when the apparatus of the instant invention is constructed for printing keys on keyboards, it further comprises a frame on the bed assembly surface for receiving a fully assembled keyboard, and a skeleton plate which is receivable on the keyboard. The skeleton plate has a plurality of apertures therethrough wherein the keys are receivable to maintain the keys in substantially stationary relation while the desired images are applied thereto. A sheet having a plurality of dye images thereon, which are in the mirror images of the desired images is overlaid on the keys so that the images are in the desired orientation thereon. In the preferred embodiment, a plurality of registration pins are provided on the frame, and a plurality of apertures are provided in the sheet for receiving the registration pins to assure proper registration of the sheet relative to the keys on the keyboard. Accordingly, dye images can be simultaneously applied to all of the keys on a fully assembled keyboard by positioning a dye bearing sheet over the keys as hereinabove set forth, placing the membrane over the keyboard, evacuating the membrane so that it is drawn into pressurized communication with the keys, and thereafter applying heat to the membrane. Hence, a keyboard can be fully assembled with blank keys, and thereafter the keys on the fully assembled keyboard can be imprinted with the desired images utilizing the apparatus of the instant invention As a result, keyboards which heretofore had to be manually assembled in order to assure that each different key was assembled in the proper location can now be robotically assembled with blank keys, and thereafter the keys can be imprinted with the desired images. Therefore it is seen that a substantial savings in labor costs can be realized with the apparatus of the instant invention, particularly when it is used for applying images to keys of a keyboard.

Accordingly, it is a primary object of the instant invention to provide an apparatus for applying a dye image to a member utilizing a sheet bearing a dye in the mirror of said image, the dye being of the type requiring heat for the application thereof and having a melting point which is below the melting point of the material comprising the member.

Another object of the instant invention is to provide an effective apparatus for practicing the method disclosed in applicant's copending U.S. patent application Ser. No. 377,666.

A further object of the instant invention is to provide an apparatus for simultaneously applying dye images to a plurality of surfaces of a three-dimensional member.

An even further object of the instant invention is to provide an apparatus for simultaneously applying dye images to a plurality of keys assembled on a keyboard.

Still another object of the instant invention is to provide an apparatus for applying a dye image to a plastic member wherein a dye bearing sheet is first overlaid on the member, a flexible membrane is overlaid on the sheet, and vacuum is applied to the membrane to effect the pressurized engagement of the dye bearing sheet with the member and wherein thereafter radiation is directed toward the sheet to effect the heating of the dye and the member so that the image is transferred to the member.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
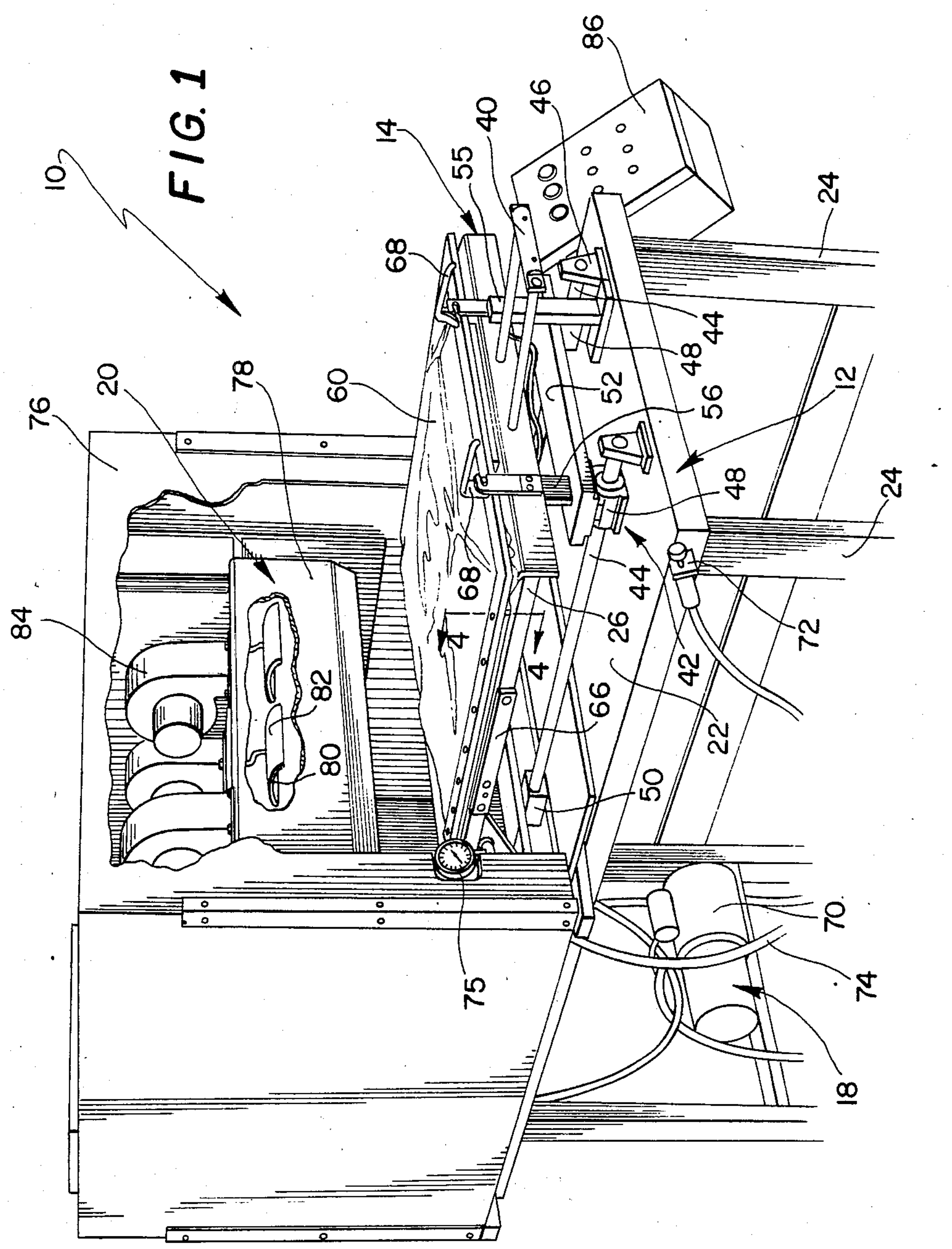
FIG. 1 is a perspective view of the apparatus of the instant invention with the flexible membrane thereof in the closed operative position.

Referring now to the drawings, the apparatus of the instant invention is illustrated and generally indicated at 10 in FIG. 1. The apparatus 10 is operable for applying dye images to members, particularly plastic members, in accordance with processes of the type wherein a sheet bearing dye in the mirror of a desired image is overlaid on a member, and the image is transferred to the member through the application of heat to the dye while the sheet is maintained in pressurized engagement with the member. The apparatus 10 generally comprises a base 12, a bed assembly 14, a flexible membrane assembly 16 which is positionable in overlying relation on the bed assembly 14, a vacuum assembly 18, and a radiant heating assembly 20. The vaccum assembly 18 is operable for evacuating the area between the membrane assembly 16 and the bed assembly 14 when the membrane assembly 16 is positioned in overlying relation on the bed assembly 14. The bed assembly 14 and the membrane assembly 16 are positionable beneath the radiant heating assembly 20 to effect radiant heating of the membrane assembly 16. Accordingly, when a member is positioned on the bed assembly 14 and a sheet bearing dye in the mirror image of a preselected image is overlaid on the member, the apparatus 10 is operable for transferring the dye from the sheet to the member to produce the preselected image thereon. Specifically, by evacuating the area between the membrane assembly 16 and the bed assembly 14 with the vacuum assembly 18, and by thereafter positioning the membrane assembly 16 and the bed assembly 14 under the radiant heat assembly 20, heat and pressure are simultaneously applied to the dye bearing sheet to transfer the dye therefrom to the member on the bed assembly 14.

Figure 2:
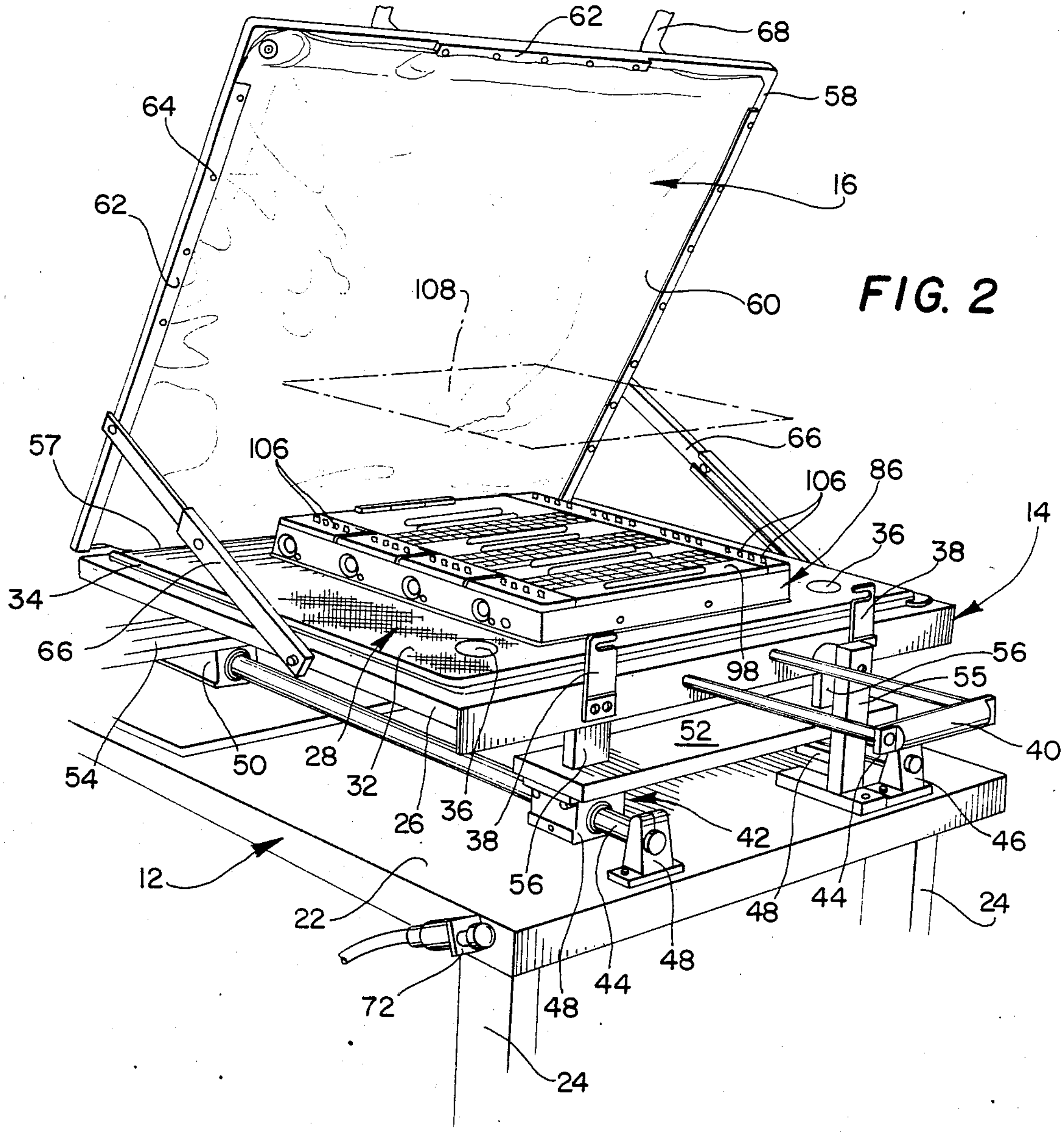
FIG. 2 is an enlarged perspective view of the front portion of the apparatus with the membrane in the raised inoperative position.

Referring to FIGS. 1 and 2, it will be seen that the base 12 comprises a table-like structure having a table top 22 and legs 24. The base assembly 12 provides a supporting structure for the remainder of the apparatus 10 as will be seen from the drawings.

Figure 4:
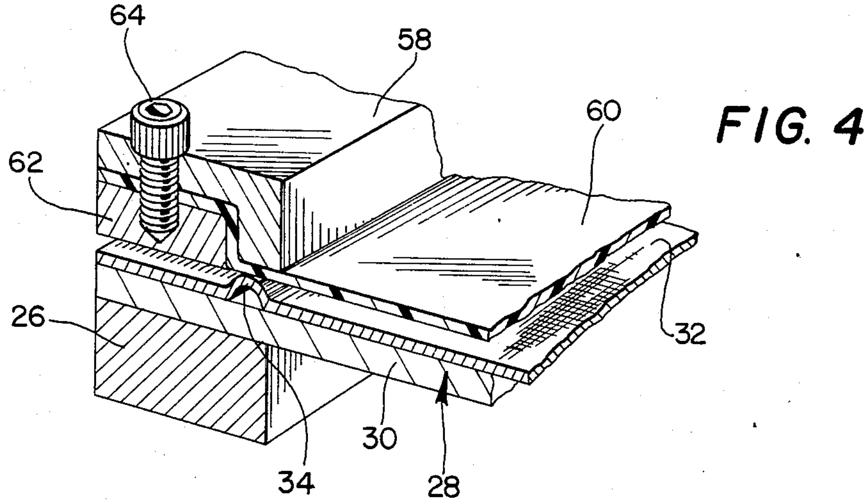
FIG. 4 is a sectional view taken along line 4—4 in FIG. 1.

The bed assembly 14 is most clearly illustrated in FIGS. 1, 2 and 4 and comprises a rectangular frame 26 and a support plate portion 28 which defines a supporting surface for receiving a member or a plurality of members in the apparatus 10 for the application of dye images thereto. As illustrated in FIG. 4, the plate portion 28 comprises a lower substrate 30 having a lamination 32 overlaid thereon, the lamination 32 defining the upper supporting surface of the plate portion 28. The lamination 32 is preferably of a substantially rigid construction and has a textured grid pattern on the upper surface thereof whereby an even vacuum can be applied over the entire area between the bed assembly 14 and the membrane assembly 16. Integrally molded in the lamination 32 is a raised ridge 34 which extends around the central portion thereof in slightly inwardly spaced relation to the periphery of the lamination 32. Provided in the plate portion 28 are vacuum caps 36 having peripheral openings therein (not shown) for evacuating the area between the bed assembly 14 and the membrane assembly 16 when the membrane assembly 16 is overlaid on the bed assembly 14, as will hereinafter be more fully brought out. Also included in the bed assembly 14 are latch members 38 and a handle 40. A mounting assembly 42 is included in the bed assembly 14 for the mounting thereof on the base 12.

The mounting assembly 42 is most clearly illustrated in FIGS. 1 and 2 and comprises a pair of slide rods 44 which are mounted in upwardly spaced rearwardly extending relation on the table top 22 with front mounts 46 and rear mounts (not shown). Received on the rods 44 are front and rear slide members 48 and 50, respectively; and front and rear cross members 52 and 54, respectively, extend between the two front slide members 48 and between the two rear slide members 50, respectively. Front vertical members 56 and rear vertical members (not shown) extend upwardly from the cross members 52 and 54, respectively, and are secured to the frame 26, whereby the frame 26 is slidably mounted on the rods 44. A front stop member 55 extends upwardly from the table top 22 to limit the extent of the forward movement of the bed assembly 14.

The membrane assembly 16 is hingedly mounted on the bed assembly 14 along the rear edge thereof as at 57 and comprises an outer frame 58 and a resilient, flexible membrane 60 which is secured to the frame 58 with strips 62 and screws 64, as illustrated in FIGS. 2 and 4. As will be seen from FIG. 4, the frame 58 is of L-shaped sectional configuration, and the strips 62 are dimensioned to interfit in the frame 58 so that the membrane 60 is captured therebetween and thereby secured to the frame 58. As will be further seen, the frame 58 is dimensioned so that when the membrane assembly 16 is received in overlying relation on the bed assembly, the frame 58 overlies the ridge 34, whereby the membrane 60 is "pinched" therebetween in order to seal the periphery of the membrane 60. Conventional telescoping arms 66 extend between the bed assembly 14 and the frame 58 for maintaining the membrane assembly 16 in the upwardly hinged or open disposition illustrated in FIG. 2 when desired. Handles 68 are attached to the frame 58 and are interengageable with the latch members 38 to maintain the membrane assembly 16 in the closed position thereof illustrated in FIG. 1 wherein it overlies the bed assembly 14.

The vacuum assembly 18 comprises a vacuum pump 70 which is mounted on the base 12 and which is actuated by a manual switch 72 mounted on the top 22. The vacuum pump 70 is connected through vacuum lines 74 to the vacuum caps 36 on the bed assembly 14 for drawing a vacuum in the area between the membrane assembly 16 and the bed assembly 14 when the membrane assembly 16 is in its lowered or closed position. Preferably the pump 70 is operable to produce a vacuum in the range of approximately twenty-eight inches of mercury as indicated by a gauge 75 in order to effect the desired pressurized communication between the membrane 60 and various members positioned on the bed assembly 14, although the operation of the apparatus 10 at other vacuum levels is possible.

The radiant heating assembly 20 is illustrated most clearly in FIG. 1 and comprises a housing 76 in which a hood 78 is mounted. A plurality of radiant heating elements 80 are mounted in the hood 78 in combination with parabolic reflectors 82 which reflect radiation from the elements 80 generally downwardly. Also mounted in the hood 78 is a plurality of blowers 84 which exhaust downwardly past the elements 80 and the reflectors 82 for cooling the heating assembly 20 during periods when the emitters 80 are deenergized. Mounted on the front portion of the base 12 is a control box 86 which contains conventional control components and which is electrically connected to the heating elements 80 and the blowers 84 to control the energization thereof.

Generally, therefore, the operation of the apparatus 10 to effect the application of a preselected dye image to a member is accomplished by positioning the member on the lamination 32 and overlying a sheet bearing dye, preferably a disperse dye, in an image which is the mirror of the preselected image on the member so that the mirror image is in the desired orientation thereon. The member itself is preferably a plastic member having a melting point which is above the melting point of the dye, as described in the applicant's aforementioned U.S. patent application No. 377,666. The membrane assembly 16 is then moved to its lowered or closed position illustrated in FIG. 1, and the handles 68 are moved into interlocking engagement with the latch members 38. The switch 72 is then manipulated to actuate the vacuum assembly 18 whereby the membrane 60 is drawn into pressurized communication with the sheet overlying the member to effect the pressurized engagement of the sheet with the member. The bed assembly 14 and the membrane assembly 16 are then moved rearwardly in the apparatus 10 so that the membrane 60 is disposed beneath the hood 78. Thereafter the control box 86 is manipulated to energize the radiant heating elements 80 to effect heating of the membrane 60 so that heating of the dye and the plastic member beneath the membrane 60 is effected to transfer the dye to the member. After the desired image has been applied to the member in this manner, the heating elements 80 and the vacuum assembly 18 are deenergized. The blowers 84 are then energized to cool the hood 78 and the housing 76 to prevent damage thereto due to overheating, and the bed assembly 14 and the membrane assembly 16 are moved forwardly and out from beneath the hood 78. The membrane assembly 16 may then be raised to the open position thereof to remove the member with the preselected image thereon.

In the preferred embodiment of the apparatus 10, the emitters 80 are constructed so that they emit radiation predominantly within the infrared range, and the membrane 60 comprises a silicone rubber membrane which is specifically receptive to radiation within the wavelength range emitted by the emitters 80 in order to achieve optimal heating conditions. Further, in the preferred embodiment, the apparatus 10 comprises conventional adjustable means for controlling the heating assembly 20 to effect the energization thereof for predetermined time intervals, and conventional adjustable feedback control means for controlling the heating elements 80 to effect heating of the membrane 60 to the desired temperature. Automatic control means for actuating the blowers 84 may also be provided. It will be understood, however, that the operation of the apparatus 10 will be different for different types of members and for different dyes and that therefore adjustments in the heating cycles of the apparatus 10 will be necessary for different operations.

Although it will be understood that the apparatus of the instant invention is operable for applying dye images to various types of members, it has proven to be particularly effective for simultaneously applying dye images to pluralities of keys on keyboards of the type used in computer input terminals, typewriters, and the like. One particularly useful and effective embodiment of the apparatus of the instant invention is adapted for applications of this type and therefore further comprises a frame assembly 86 of the type illustrated in FIGS. 2 and 3 for receiving and positioning one or a plurality of keyboard assemblies 88 on the bed assembly 14. The frame assembly 86 as illustrated in FIG. 4 is operable for receiving four keyboard assemblies 88, although it will be understood that frame assemblies of this type can be constructed for receiving various numbers of keyboard assemblies 88 as desired. The frame assembly 86 includes a base frame portion 90 of generally rectangular configuration, end blocks 92 which are secured to the base frame portion 90, and positioning lugs 94 and 96. The keyboard assembly 88 is receivable in the frame assembly 86 so that it is located in desired registry therein by means of the lugs 94 and 96, and a skeleton plate 98 having a plurality of apertures 100 therein is receivable on the keyboard assembly 88. Specifically, the skeleton plate 98 is receivable on the keyboard assembly 88, which includes a plurality of individual keys 102 having slightly concave printing surfaces 103, so that the keys 102 are received in the apertures 100 to maintain the keys 102 in stationary relation. End plates 104 having upwardly extending positioning pins 106 are also included in the frame assembly 86 and are receivable on the blocks 92 adjacent opposite ends of the skeleton plate 98. A sheet 108 bearing dye images 110 and having positioning slots 112 therein is receivable on the skeleton plate 98 and the end plates 104 so that the positioning pins 106 are received in the slots 112. Rounded bars 114 are receivable on the portions of the pins 106 which protrude through the sheet 108 so that the pins 106 do not rupture the membrane 60 when it is drawn downwardly with the evacuating assembly 18.

Figure 3:
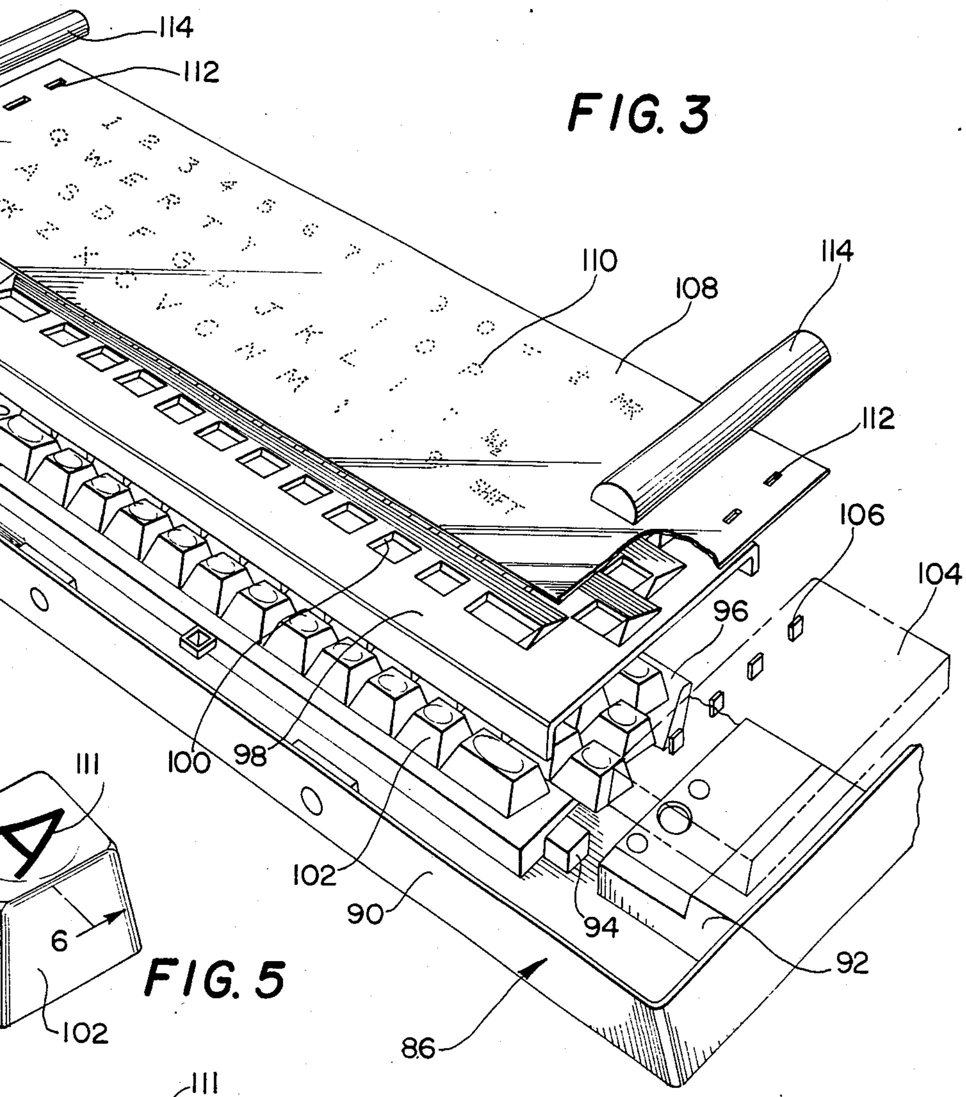
FIG. 3 is a perspective view of a keyboard assembly received in a frame assembly and a dye bearing sheet which is receivable in overlying relation on the keyboard assembly.
Figure 5:
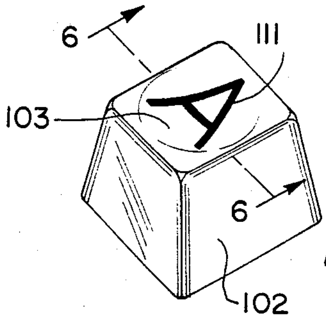
FIG. 5 is an enlarged perspective view of a single key of the keyboard assembly illustrated in FIG. 3.
Figure 6:
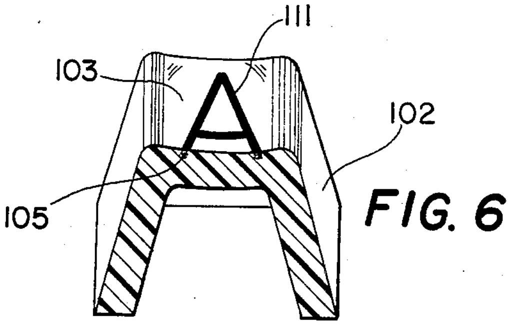
FIG. 6 is a sectional view taken along line 6—6 in FIG. 5.
Figure 7:
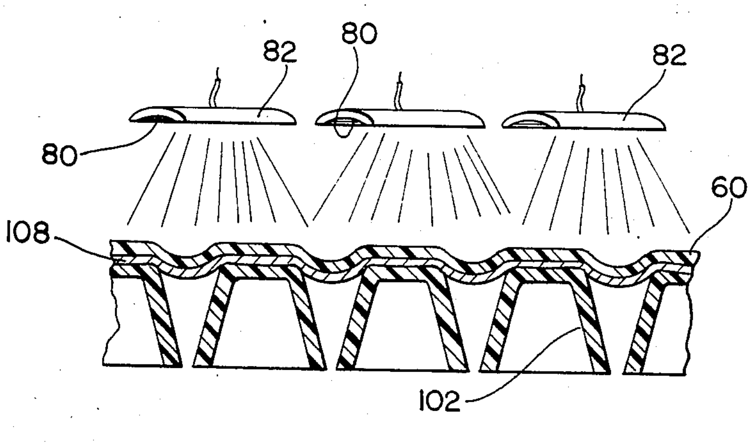
FIG. 7 is a schematic sectional view of a plurality of keys with a dye bearing sheet and the flexible membrane overlaid thereon and a plurality of radiation emitters.

The sheet 108 preferably comprises a paper sheet having a layer of thermoset polymer applied to one surface thereof so that the polymer is intermixed with the paper fibers, as described in the aforementioned copending U.S. patent application Ser. No. 377,666. Accordingly, when heat and pressure are simultaneously applied to the sheet 108, it conforms to the configurations of the tops of the keys 102, whereby clear and undistorted images are applied to the keys 102. For purposes of illustration, the images 110 as shown in FIG. 3 are visible on the upper surface of the sheet 108. However, in actual application, the upper surface of the sheet 108 is preferably coated with the thermoset polymer as hereinabove mentioned, and the images 110 which comprise dye in the mirror images of the preselected images which are to be applied to the keys 102 are disposed on the underside of the sheet 108. The images 110 are positioned on the sheet 108 so that when the sheet 108 is overlaid on the skeleton plate 98 as hereinabove set forth, the images 110 are properly oriented on the tops of the appropriate keys 102. Accordingly, when heat and pressure are applied to the sheet 108, the dye comprising the images 110 is transferred to the keys 102 to produce the preselected images on the surfaces 103. In this regard, when the apparatus 10 is operated in accordance with the applicant's copending U.S. patent application Ser. No. 377,266, so that the member 102 is a plastic member and the dye used comprises a disperse dye, the dye actually diffuses into the plastic as illustrated at 105 in FIG. 6.

Figure 8:
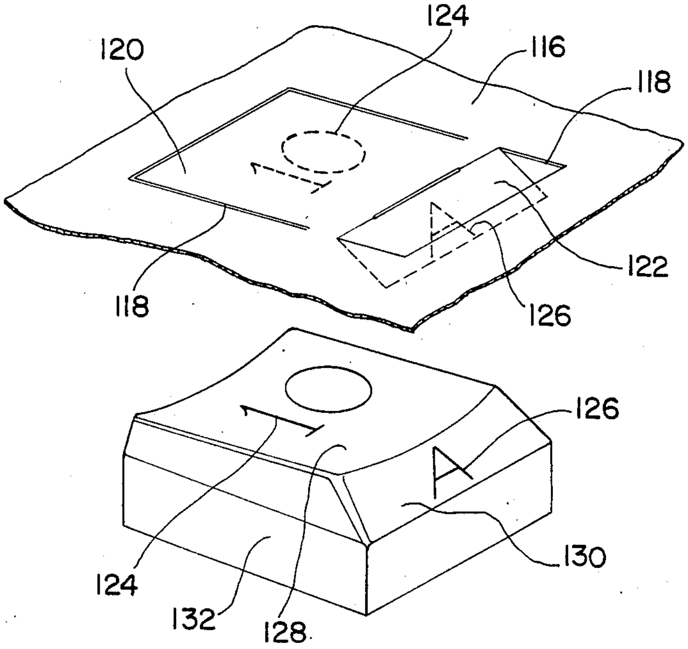
FIG. 8 is an enlarged perspective view of a key having first and second printing surfaces and a die-cut dye bearing sheet.
Figure 9:
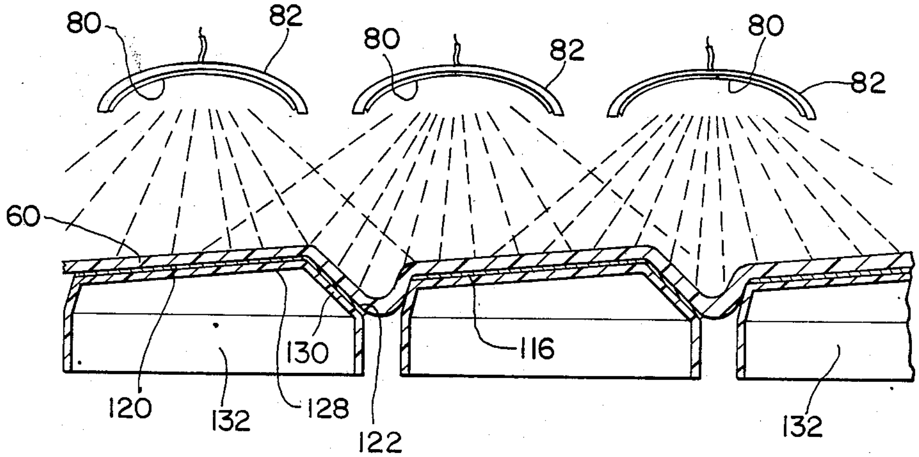
FIG. 9 is a schematic sectional view illustrating the application of heat to a plurality of keys of the type illustrated in FIG. 8 utilizing radiation emitters having parabolic reflectors.

While the apparatus 10 is operable for applying dye images to members having somewhat irregular surface characteristics, such as the keys 102 which have slightly concave upper surfaces 103, it is also operable for applying dye images to several different nonparallel surfaces of a member. In this regard, referring to FIGS. 8 and 9, it will be seen that a sheet 116 which is die-cut as at 118 to define first and second flaps 120 and 122 can be used to apply first and second images 124 and 126 to first and second nonparallel surfaces 128 and 130, respectively, of a member 132. As schematically illustrated in FIG. 9, when the sheet 116 is overlaid on the member 132 and the membrane 60 is urged into pressurized engagement with the sheet 116, the flaps 120 and 122 overlay the surfaces 128 and 130, respectively, in pressurized engagement therewith. Accordingly, when the emitters 80 are energized to heat the membrane 60, the image 124 is applied to the surface 128, and the image 126 is applied to the surface 130. In this connection, since the emitters 80 include parabolic reflectors 82, the radiation emitted by the emitters 80 is directed toward the membrane 60 at various angles relative thereto so that the radiation is uniformly received thereon to effect heating of the surface 128, as well as the surface 130, which is at a substantial angle to the plane of the bed assembly 14.

It is seen, therefore, that the instant invention provides an effective apparatus for applying images to members, particularly plastic members, utilizing dye bearing sheets. Because the apparatus of the instant invention uses the flexible membrane 60 for applying pressure to various members when the vacuum assembly 18 is activated, the apparatus of the instant invention is operable for applying images to irregular surfaces, such as the composite surface defined by the tops of the keys 102. Hence the apparatus of the instant invention is operable for applying one or a plurality of dye images to one or more plastic members having various surface configurations. Accordingly, it is seen that the apparatus of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An apparatus for simultaneously applying a plurality of preselected dye images to an assembly of a plurality of keycaps having respective irregular printing surfaces, by utilizing a flexible sheet bearing said dye in the mirror images of said preselected images, said dye being of the type requiring heat for the application thereof and having a melting point which is below the melting point of the material of which the assembly of keycaps is constructed comprising:

(a) a base;

(b) a bed mounted on said base, said bed having a support surface for receiving said assembly of keycaps and said flexible sheet thereon with said sheet overlying said irregular printing surfaces of said assembly of keycaps so that said dye mirror images face said irregular printing surfaces in a predetermined orientation;

(c) a continuous resilient, flexible membrane attached to said apparatus and positionable in overlying relation on said assembly of keycaps and on the portion of said bed surface adjacent thereto;

(d) means for establishing a pressure differential between opposite sides of said membrane to urge the membrane overlying said bed surface portion into engagement therewith and to urge said membrane overlying said assembly of keycaps into pressurized communication with said flexible sheet to simultaneously register and conform the dye images on said flexible sheet to said plurality of irregular printing surfaces of said assembly of keycaps to thereby effect the pressurized engagement of said dye images with said irregular printing surfaces; and (e) radiant heating means for heating said membrane and thereby heating said sheet to apply said preselected images to said plurality of keycaps.

2. In the apparatus of claim 1, said assembly of keycaps further characterized as an assembly of plastic keycaps, said dye further characterized as a disperse dye.

3. In the apparatus of claim 2, said radiant heating means further characterized as infrared radiant heating means.

4. In the apparatus of claim 3, said membrane further characterized as a silicone rubber membrane.

5. In the apparatus of claim 4, said membrane and said heating means further characterized as being matched so that said membrane is specifically absorptive to radiation emitted by said heating means.

6. The apparatus of claim 1 further comprising means for positioning individual keycaps of said assembly and said sheet so that said sheet overlies said keycaps with said mirror images facing said individual keycaps in a predetermined orientation.

7. In the apparatus of claim 6, said plurality of keycaps being assembled on a keyboard assembly, said positioning means comprising a frame assembly received on said bed surface, said keyboard assembly being received in said frame, said frame assembly including a skeleton plate having a plurality of apertures therein received on said keyboard assembly so that said keycaps are snugly received in said apertures and thereby securely positioned in said frame assembly, said skeleton plate also having a plurality of positioning pins thereon, said sheet having a plurality of spaced positioning apertures therein, said pins being receivable in said positioning apertures to position said sheet relative to said keycaps so that said dye mirror images face said keycaps in said preselected orientation.

8. In the apparatus of claim 1, said assembly of a plurality of keycaps irregular printing surfaces having printing surfaces which are disposed in nonparallel relation to said bed surface, the portion of said sheet adjacent said mirror images further characterized as being die-cut to define a flap therein and overlying said printing surfaces with said mirror images facing said printing surfaces.

9. In the apparatus of claim 8, said assembly of a plurality of keycaps having irregular printing surfaces which include first and second non-parallel printing surfaces thereon, said sheet having first and second dye mirror images thereon, the portions of said sheet adjacent both said first and second mirror images being die-cut to define first and second flaps in said sheet, respectively, and overlying said first and second printing surfaces, respectively, so that said first mirror image faces said first printing surface and said second mirror image faces said second printing surface.

10. In the apparatus of claim 9, said heating means further characterized as radiant heating means which emits radiation directed at both of said first and second printing surfaces.

11. The apparatus of claim 10, said heating means comprising:

(a) a radiation emitter;

(b) a parabolic reflector disposed adjacent said emitter for directing radiation therefrom toward both of said first and second printing surfaces.

12. Apparatus in accordance with claim 1 wherein said means for establishing a pressure differential comprises vacuum means.

* * * * *